(12) United States Patent
Kim (10) Patent No.: US 10,661,158 B2
(45) Date of Patent: May 26, 2020

(54) GAME OPERATION PANEL CAPABLE OF COMMUNICATING GAME INFORMATION, AND GAME DEVICE INCLUDING SAME

(71) Applicant: TOVIS CO., LTD., Incheon (KR)

(72) Inventor: Yong Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 16/300,062

(22) PCT Filed: Feb. 17, 2017

(86) PCT No.: PCT/KR2017/001769
§ 371 (c)(1),
(2) Date: Nov. 9, 2018

(87) PCT Pub. No.: WO2017/195969
PCT Pub. Date: Nov. 16, 2017

(65) Prior Publication Data
US 2019/0151752 A1 May 23, 2019

(30) Foreign Application Priority Data
May 9, 2016 (KR) .......................... 10-2016-0056617

(51) Int. Cl.
*A63F 13/2145* (2014.01)
*H04W 4/00* (2018.01)
(Continued)

(52) U.S. Cl.
CPC ........ *A63F 13/2145* (2014.09); *A63F 13/235* (2014.09); *A63F 13/25* (2014.09);
(Continued)

(58) Field of Classification Search
CPC .... A63F 13/2145; A63F 13/235; A63F 13/25; G07F 17/32; H02J 7/02; H04W 4/00; H04W 4/80
See application file for complete search history.

(56) References Cited

U.S. PATENT DOCUMENTS 7,167,724 B2 * 1/2007 Yamagishi ............. G06Q 20/14
455/408
9,489,794 B2 * 11/2016 Hilbert ................ G07F 17/3211
(Continued)

FOREIGN PATENT DOCUMENTS

| JP | 2004-351072 A | 12/2005 |
| JP | 2008-062047 A | 3/2008 |

(Continued)

OTHER PUBLICATIONS

"Near-field communication", Wiki, Dec. 23, 2016, <https://en.wikipedia.org/w/index.php?title=Near-field_communication&oldid=756256801> (Year: 2016).*
(Continued)

*Primary Examiner* — Justin L Myhr
(74) *Attorney, Agent, or Firm* — Revolution IP, PLLC (57) ABSTRACT

A game manipulation panel capable of communicating game information, the game manipulation panel includes: a panel body configured to generate a manipulation signal for playing a game; and an antenna member positioned in a portion of the panel body to transmit and receive a signal for transferring game information to a short-range wireless communication module that performs nearfield communication (NFC) with a portable device.

6 Claims, 5 Drawing Sheets

(51) Int. Cl.
*H02J 7/02* (2016.01)
*G07F 17/32* (2006.01)
*A63F 13/235* (2014.01)
*A63F 13/25* (2014.01)
*H04W 4/80* (2018.01)

(52) U.S. Cl.
CPC ............... *G07F 17/32* (2013.01); *H02J 7/02* (2013.01); *H04W 4/00* (2013.01); *H04W 4/80* (2018.02)

(56) References Cited

U.S. PATENT DOCUMENTS

| | | | |
|---|---|---|---|
| 2007/0293300 A1* | 12/2007 | Kojima | G07F 17/32 463/20 |
| 2008/0058065 A1 | 3/2008 | Okada | |
| 2010/0087241 A1* | 4/2010 | Nguyen | G07F 17/3218 463/17 |
| 2013/0015938 A1* | 1/2013 | Park | H01Q 7/00 336/232 |
| 2013/0106723 A1* | 5/2013 | Bakken | G06F 3/03545 345/173 |
| 2013/0303263 A1* | 11/2013 | LeMay | G07F 17/3218 463/25 |
| 2013/0324237 A1* | 12/2013 | Adiraju | G07F 17/3225 463/29 |
| 2014/0141864 A1* | 5/2014 | Ward | G07F 17/34 463/25 |
| 2016/0064814 A1* | 3/2016 | Jang | H01Q 1/526 343/842 |

FOREIGN PATENT DOCUMENTS

| | | |
|---|---|---|
| JP | 2014-210096 A | 11/2014 |
| JP | 2015-192701 A | 11/2015 |
| JP | 5876956 B1 | 3/2016 |
| KR | 10-2004-0060396 A | 7/2004 |
| KR | 10-0526742 B1 | 11/2005 |
| KR | 10-2014-0031446 A | 3/2014 |
| KR | 10-2015-0004331 A | 1/2015 |

OTHER PUBLICATIONS

International Search Report for PCT/KR2017/001769 dated May 23, 2017 from Korean Intellectual Property Office.

* cited by examiner

GAME OPERATION PANEL CAPABLE OF COMMUNICATING GAME INFORMATION, AND GAME DEVICE INCLUDING SAME

TECHNICAL FIELD

The present invention relates to a manipulation panel for a game device, which is manipulated to play a game, and a game device including the same.

BACKGROUND ART

In general, a game device provided in an accredited place such as a casino in, for example, Las Vegas or Macao executes a game in such a manner of controlling the game based on manipulation information from a manipulation mechanism.

Meanwhile, some games require game money. In an online game, the game money is paid online in use, but in the case of an offline game, the game money is paid by directly putting cash into a game device or by charging a card at a charging station.

Then, a game may be executed by plugging the card, charged with the game money, into a card reader of the game device when in use. The remaining balance is mainly printed with a printer, so that a printed output (balance) may be used in another game device or may be exchanged for cash at an automated teller machine (ATM) (that may perform a game-money-charging function) provided in a game room.

In addition, a system referred to as a "player-tracking system" is used for customer management and personal history management, for example, in such a manner that personal information, a game history, and the like of a player who plays a game using a game device is recorded in a card and a bonus is awarded to the player from a game room in a certain form similar to mileage accumulation according to the game device or the game room, or in such a manner that discounts are available for dining and convenience facilities in the game room through the use of the card.

However, a conventional player-tracking system has caused adverse effects such as, for example, wasting of paper due to frequent printing and thus increasing the cost of consumables in the game room when the player frequently changes games as well as acceleration of global warming due to the use of excessive paper in terms of environmental pollution.

In addition, since the player-tracking system uses the card as an information input/output tool, the loss of the card and damage to the card may often occur, and when the card is used to pay for dining or convenience facilities, for example, in the game room, an identity verification procedure is required, which is inconvenient to use.

In addition, the case in which, when the player plays a game for a long time using a portable device, the portable device may be discharged, which makes important communication become impossible, or the case in which the player loses his/her portable device after leaving the portable device on the game device frequently occurs. For this reason, Korean Patent Application No. 10-2015-0128896, entitled "GAME MANIPULATION PANEL CAPABLE OF CHARGING MOBILE PHONE AND GAME DEVICE INCLUDING THE SAME", by the applicant of the present invention is referenced herein in order to solve the above-mentioned problems.

PRIOR ART DOCUMENT

Patent Document (Patent Document 1) Korean Patent Laid-Open Publication No. 10-2004-0060396 (published on Jul. 6, 2004)
(Patent Document 2) Korean Patent Registration No. 10-0526742 (published on Nov. 8, 2005)
(Patent Document 3) Korean Patent Laid-Open Publication No. 10-2015-0004331 (published on Jan. 12, 2015)
(Patent Document 4) Korean Patent Laid-Open Publication No. 10-2014-0031446 (published on Mar. 13, 2014)

DISCLOSURE

Technical Problem

The present invention has been made in view of the above problems, and it is an object of the present invention to provide a game manipulation panel capable of communicating game information and a game device including the same, which are capable of mutual exchange and processing of game information, such as remaining game money, or personal information, bonus points, or a game history provided by an existing player-tracking system via communication between the game device and a portable device, which are capable of preventing the waste of paper due to frequent printing by a printer of the game device, which are capable of preventing any inconvenience caused when using a player card, such as the loss of the card, damage to the card, and an identity verification procedure, and which are capable of preventing the loss of the portable device.

Technical Solution

In accordance with one aspect of the present invention, the above and other objects can be accomplished by the provision of a game manipulation panel capable of communicating game information, the game manipulation panel including a panel body configured to generate a manipulation signal for playing a game, and an antenna member positioned in a portion of the panel body to transmit and receive a signal for transferring game information to a short-range wireless communication module that performs nearfield communication (NFC) with a portable device.

The antenna member may be an NFC antenna.

The game manipulation panel may further include a device-sensing sensor configured to sense whether or not the portable device is seated on the portion in which the antenna member is positioned.

The device-sensing sensor may be one of the short-range communication module including the antenna member, a heat-sensing sensor, a touch sensor, an (electro)magnetic-field-sensing sensor, an IR sensor, a pressure sensor, and an illuminance sensor.

The panel body may include a touch panel configured to generate the manipulation signal in response to a touch of a player, and a display panel superimposed on the touch panel to display an image of a manipulation button that induces the touch of the player.

The touch panel may include an electrically conductive pattern configured to generate the manipulation signal in response to the touch, and a portion of the electrically conductive pattern may be formed to have an antenna shape so that the electrically conductive pattern includes the antenna member so as to transmit and receive the signal to and from the portable device.

The panel body may include a manipulation mechanism configured to generate the manipulation signal by mechanical operation.

The panel body may include a charger positioned in a portion of the panel body to wirelessly charge the portable device by magnetic-induction or resonance.

The panel body may include a touch panel including an electrically conductive pattern configured to generate the manipulation signal in response to a touch, and the electrically conductive pattern may include a charging coil member configured to generate magnetic-induction or resonance of the charger.

In accordance with another aspect of the present invention, there is provided a game device including the game manipulation panel capable of communicating game information according to the above aspect, the game device further including the short-range communication module including the antenna member to perform nearfield communication with a portable device, a game display panel configured to display an image of a game manipulated by the manipulation panel, and a game device body provided with the game display panel and the game manipulation panel capable of communicating game information.

Advantageous Effects

According to the present invention, an antenna member, which performs nearfield communication, is provided in a panel body of a game manipulation panel to wirelessly communicate game information, which may be provided to a player, with a portable device of the player. Thereby, it is possible to prevent the waste of paper due to the printing of the balance of game money and to eliminate inconvenience caused when a player card is used. In addition, the player can manage the game information using the portable device.

In addition, by providing, for example, an event or a notice from a game room to the portable device, it is possible to achieve efficient management and advertisement effects of the game room.

In addition, a charger may be provided in the panel body so that charging of the portable device may be performed while the player plays a game.

In addition, when the panel body includes a touch panel, a metal pattern as an electrically conductive pattern may be integrally formed with a charging coil member of the charger or the antenna member. Thereby, it is possible to reduce manufacturing costs and to ensure easy manufacture owing to a simplified structure.

DESCRIPTION OF REFERENCE NUMERALS

100: game manipulation panel capable of communicating game information
110: panel body 111: manipulation mechanism
120: touch panel 121: electrically conductive pattern
130: display panel 150: charger
151: cradle 155: charging coil member
170: warning generator 171a: absence-sensing sensor
171b: pressure sensor 171c: card reader
171d: camera 175: warning member
190: short-range wireless communication module 191: antenna member
195: device-sensing sensor 200: game device
210: game display panel 230: game device main body
250: seat 300: portable device

MODE FOR INVENTION

Hereinafter, an embodiment of the present invention will be described with reference to the accompanying drawings.

Figure 1:
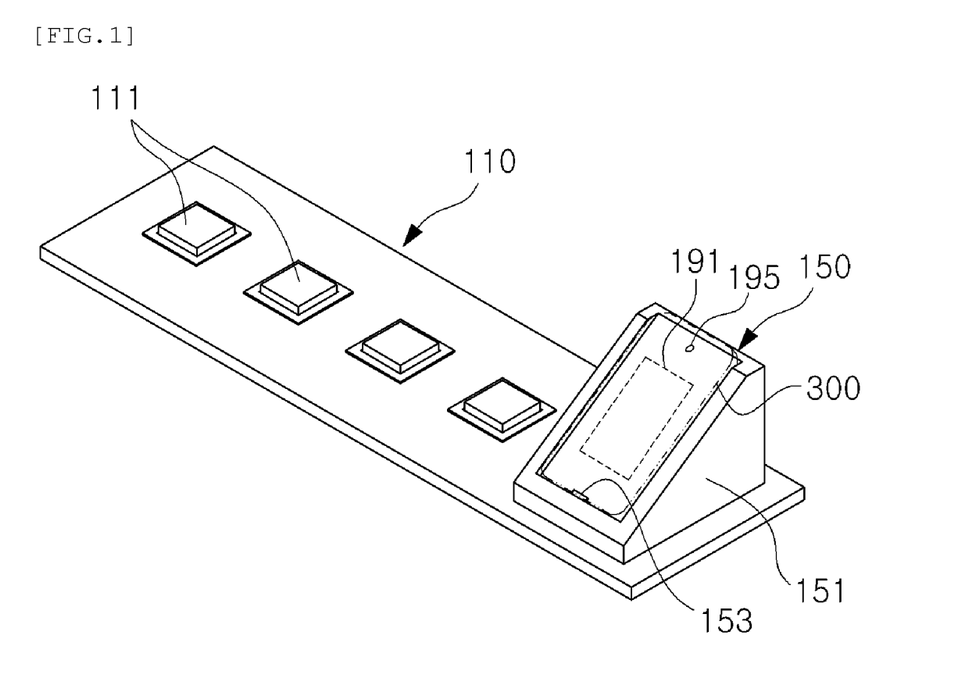
FIG. 1 is a perspective view illustrating a game manipulation panel capable of communicating game information according to an embodiment of the present invention.
Figure 2:
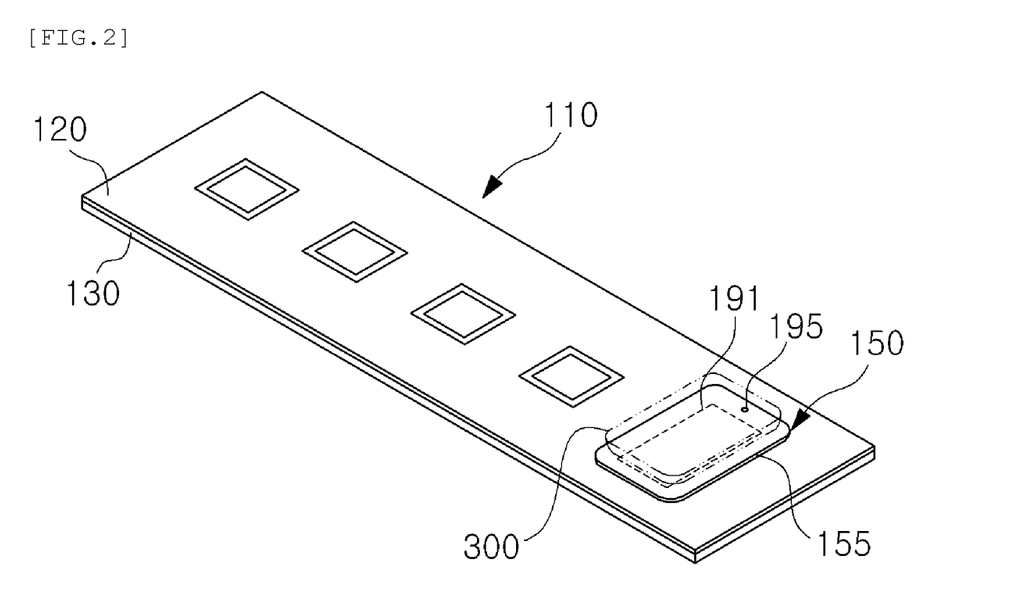
FIG. 2 is a perspective view illustrating a modification of the game manipulation panel capable of communicating game information according to the embodiment of the present invention, in which a manipulation mechanism is realized by a touch panel and a display panel.

As illustrated in FIGS. 1 and 2, a game manipulation panel 100 capable of communicating game information according to the embodiment of the present invention may include a panel body 110.

The panel body 110 may generate a manipulation signal in response to manipulation by a player who plays a game.

The panel body 110 may be formed to have a plate shape, and may include a manipulation mechanism 111.

The manipulation mechanism 111 may be realized by manipulation buttons or a joystick. The manipulation buttons and the joystick are known technologies, and thus a detailed description thereof is omitted.

Figure 4:
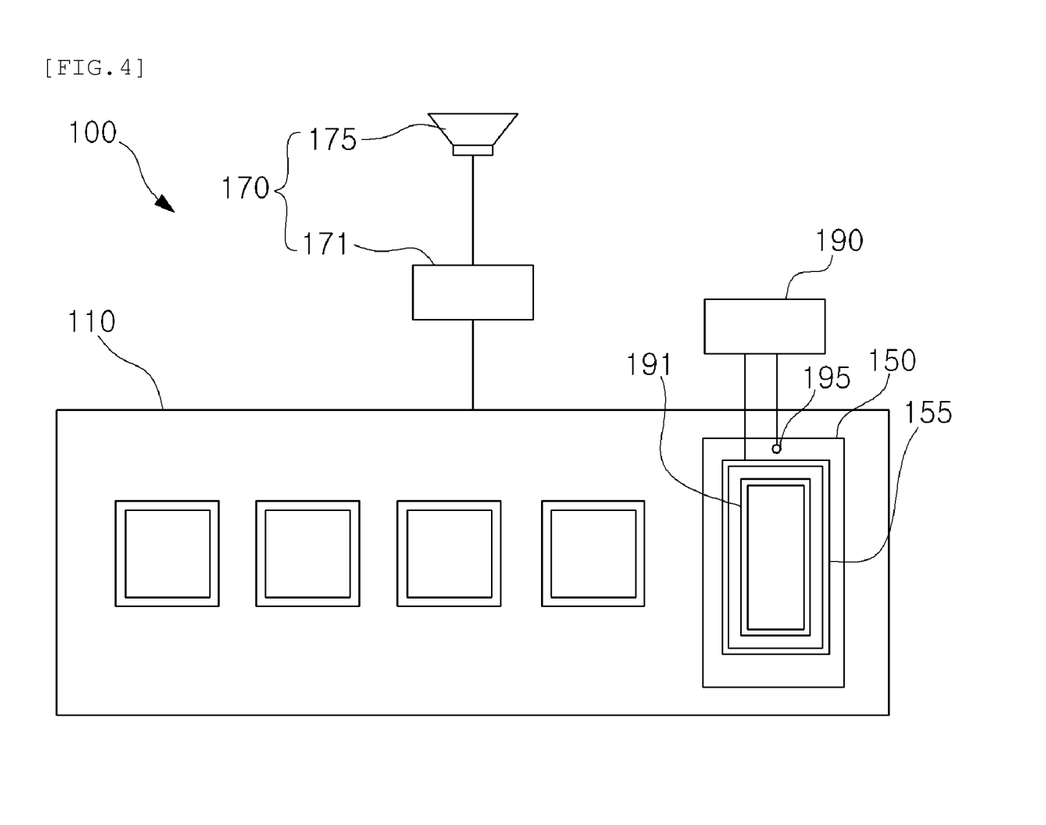
FIG. 4 is a schematic view illustrating the configuration of the game manipulation panel capable of communicating game information according to the embodiment of the present invention.

As illustrated in FIGS. 2 and 4, the game manipulation panel 100 capable of communicating game information according to the embodiment of the present invention may include an antenna member 191.

The antenna member 191 may transmit and receive a signal so that a short-range communication module 190 communicates with a portable device 300 to transmit and receive game information.

Here, examples of game information may include charged game money, the balance of game money remaining after use, bonus points, game time, game acquisition points, the number of times a game is executed, and personal information of a player, which may be used by a player-tracking system provided in a game room.

The game information to be wirelessly communicated with the portable device 300 excludes information that may have an effect on the winning rate of a game, i.e. information that is directly concerned with a game.

In addition, the game information may be transmitted and received between a game device and the portable device 300 via an application that is operated by the portable device 300 and is available in the game room.

The antenna member 190 may be a nearfield communication (NFC) antenna for nearfield communication with the portable device 300, and the short-range communication module 190 may also be an NFC module.

Figure 3:
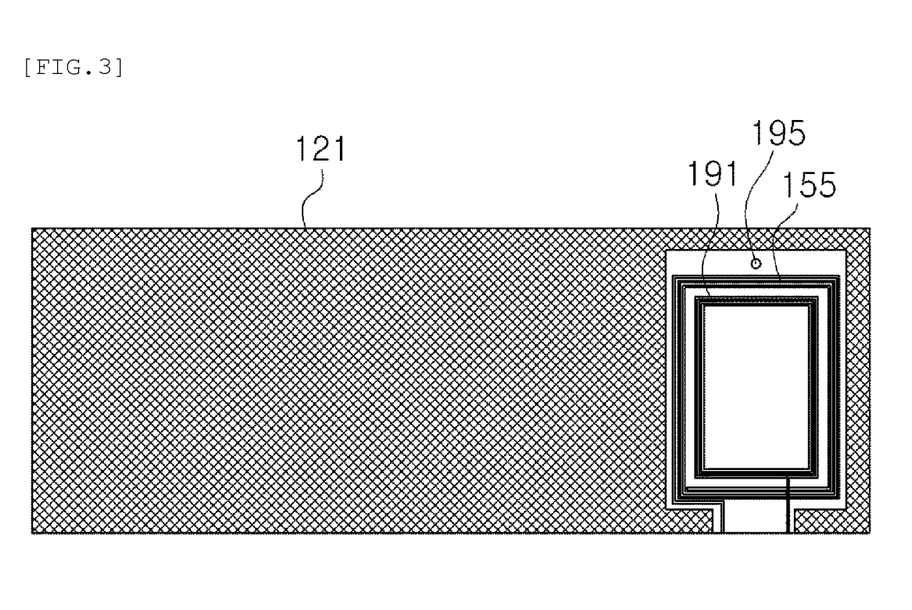
FIG. 3 is a plan view schematically illustrating an electrically conductive pattern of the touch panel which constitutes the game manipulation panel capable of communicating game information according to the embodiment of the present invention.

As illustrated in FIGS. 2 and 3, the panel body 110 may include a touch panel 120 and a display panel 130.

The touch panel 120 may provide a manipulation signal to a game device 200 in response to a touch of the player, and the display panel 130 may display an image for inducing a touch for the manipulation signal.

The touch panel 120 may be superimposed on the upper surface of the display panel 130 and may provide the coordinates of a position at which the player touches the touch-inducing image on the display panel 130.

Alternatively, the panel body 100 may be realized only by the display panel 130 and the touch panel 120 without the manipulation mechanism 111, or the manipulation mechanism 111, the display panel 130, and the touch panel 120 may be integrated such that the display panel 130 and the touch panel 120 are provided around the periphery of the manipulation mechanism 111.

As illustrated in FIG. 3, the touch panel 120 may include an electrically conductive pattern 121, which is formed in any of various forms using an electrically conductive material so as to generate a touch signal. The electrically conductive pattern 121 and the antenna member 191 may be integrally formed in such a manner that a portion of the electrically conductive pattern 121 takes the form of the antenna member 191 so as to perform the function of the antenna member 191.

Here, the electrically conductive pattern 121 may be realized by ITO, graphene, silver nanowires, a metal mesh, or the like.

As illustrated in FIG. 3, a portion of the electrically conductive pattern 121 of the touch panel 120 may take the form of a charging coil member 155, which generates magnetic-induction or resonance to enable wireless charging of the portable device 300, so that the electrically conductive pattern 121 may be integrally formed with the charging coil member 155.

As such, the electrically conductive pattern 121 may be integrally formed with both the antenna member 191 and the charging coil member 155. The charging coil member 155 and the antenna member 191 may be formed in the same portion of the electrically conductive pattern 121 so that the antenna member 191 is formed around the charging coil member 155 or so that the charging coil member 155 is positioned around the antenna member 191.

As illustrated in FIGS. 1 to 4, the game manipulation panel 100 capable of communicating game information according to the embodiment of the present invention may include a device-sensing sensor 195.

The device-sensing sensor 195 may sense the state in which the portable device 300 is seated on the antenna member 191 of the panel body 110.

The device-sensing sensor 195 may be any one of the short-range communication module 190 including the antenna member 191, an IR sensor, a pressure sensor 171b, an illuminance sensor, a camera, a heat-sensing sensor, a touch sensor, and an (electro)magnetic-field-sensing sensor. When the portable device 300 is seated on the antenna member 191 of the panel body 110, the device-sensing sensor 195 may recognize the portable device 300 and operate the short-range communication module 190. When the portable device 300 is removed from the antenna member 191, the device-sensing sensor 195 may stop the operation of the short-range communication module 190.

As illustrated in FIGS. 1 and 2, the game manipulation panel 100 capable of communicating game information according to the embodiment of the present invention may include a charger 150.

The charger 150 may electrically charge the portable device 300 seated on the antenna member 191 of the panel body 110.

The charger 150 may include a charging cradle 151.

The charging cradle 151 may perform charging of the portable device 300 when the portable device 300 is placed thereon. The charging cradle 151 may be provided with a (wired) charging jack, which supplies a voltage to the portable device 300.

In addition, the charging cradle 151 may include a voltage adaptor, which converts the voltage supplied to the panel body 110 into the voltage of the portable device 300 and supplies the converted voltage to the charging jack.

The charging cradle 151 may be provided with both the antenna member 191 and the device-sensing sensor 195.

The charger 150 may include the charging coil member 155.

The charging coil member 155 may wirelessly charge the portable device 300 without connecting the charging jack to the portable device 300.

Here, the charging coil member 155 may be configured to generate only magnetic-induction or resonance, or to selectively generate magnetic-induction or resonance, so that the portable device 300 is charged when receiving the magnetic-induction or resonance via a reception coil provided therein.

It is to be noted that the charging coil member 155 may be provided in the charging cradle 151 when the charging cradle 151 is provided in the charger 150.

The charging coil member 155 may be provided in a sectionalized portion of the panel body 110, and may be operated by the voltage supplied to the panel body 110.

In addition, as described above, the electrically conductive pattern 121 and the charging coil member 155 are integrally formed with each other by forming a portion of the electrically conductive pattern 121 constituting the touch panel 120 to take the form of a charging coil.

Here, since the charging coil member 155 and the antenna member 191 are configured to have shapes similar to each other, only one of the charging coil member 155 and the antenna member 191 may be selectively used to perform charging or communication.

In the game manipulation panel 100 capable of communicating game information configured as described above, when the player puts the portable device 300 on the panel body 110, the device-sensing sensor 195 may recognize the portable device 300, and may operate the short-range wireless communication module 190 and/or the charger 150 based on the recognized information.

When the short-range wireless communication module 190 and the charger 150 are operated, the portable device 300 and the short-range wireless communication module 190 communicate with each other via the antenna member 191 to exchange the game information so that the player plays a game based on the game information, and the charger 150 generates magnetic-induction or resonance via the charging coil member 155 so that the reception coil of the portable device 300 receives the generated magnetic-induction or resonance to realize charging of the portable device 100.

Then, the device-sensing sensor 195 may stop the operation of the short-range communication module 190 and the charger 150 upon sensing removal of the portable device.

Hereinafter, a game device, to which a game manipulation panel capable of communicating game information is applicable, according to an embodiment of the present invention includes the game manipulation panel capable of communicating game information according to the above-described embodiment.

Figure 5:
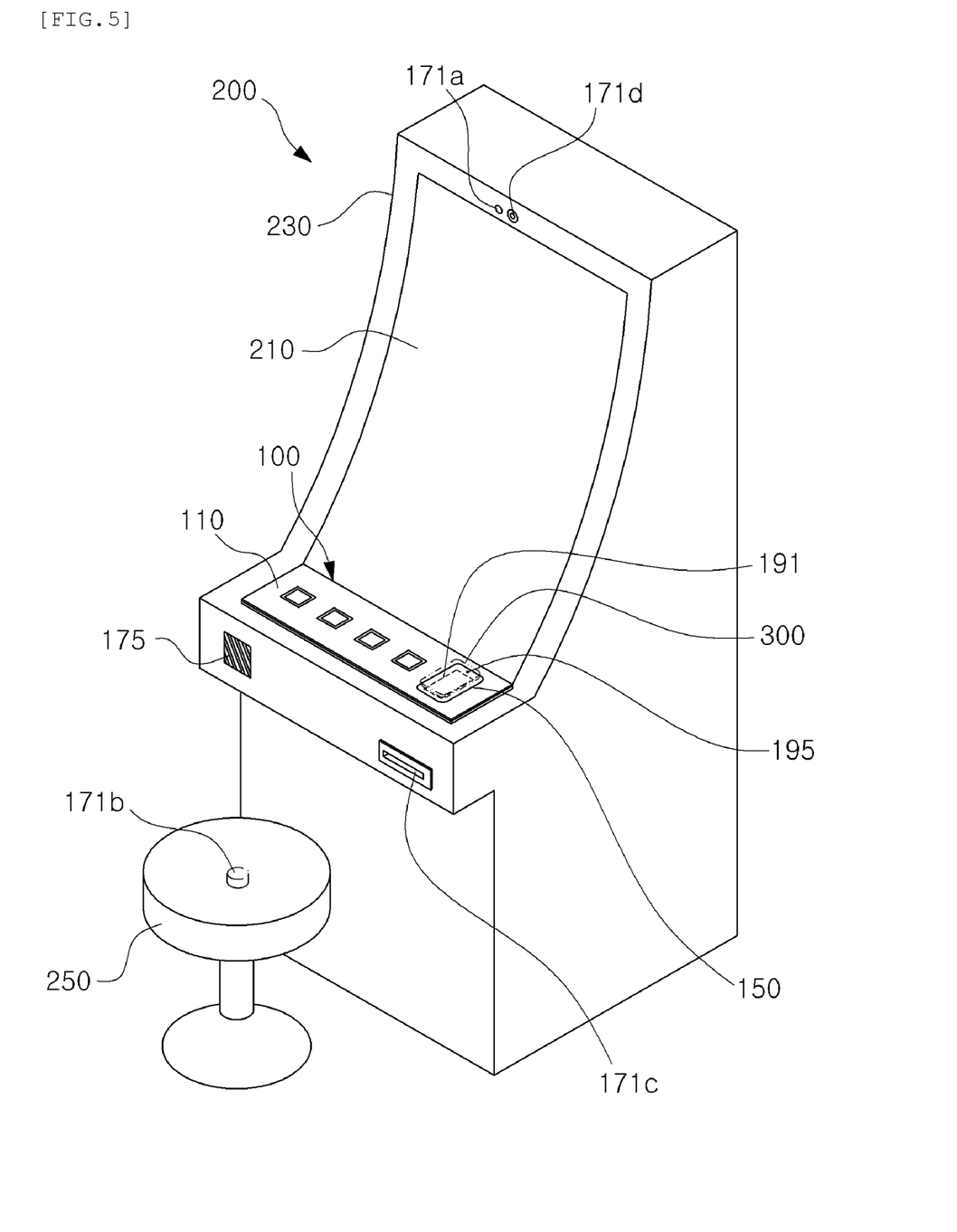
FIG. 5 is a perspective view illustrating a game device including the game manipulation panel capable of communicating game information according to the embodiment of the present invention.

As illustrated in FIG. 5, the game device 200 including the game manipulation panel capable of communicating game information according to the embodiment of the present invention may include a warning generator 170.

The warning generator 170 may issue a warning in order to prevent the loss of the portable device 300 when the player leaves the game device 200 in the state in which the portable device 300 is seated on the charger 150.

Meanwhile, the warning generator 170 may include a warning member 175, which issues a warning. The warning member 175 may include an LED lamp, which issues a visual warning in response to a warning signal, or may include a speaker, which issues an audible warning.

In addition, the warning generator 170 may start to operate from the time of sensing the state in which the portable device 300 is placed on the charger 150, i.e. from the time of sensing that the portable device 300 is being charged. That the portable device 300 is being charged may be sensed by measuring a change in current in the charger 150 or by the device-sensing sensor 195.

In addition, the warning generator 170 may include an absence-sensing sensor 171a, which senses that the player has left the game device 200. The absence-sensing sensor 171a may include any one or two or more of the short-range communication module 190 including the antenna member 191, an IR sensor, the pressure sensor 171b, an illuminance sensor, a camera, a heat-sensing sensor, a touch sensor, and an (electro)magnetic-field-sensing sensor.

Here, when the absence-sensing sensor 171a includes the pressure sensor 171b, the pressure sensor 171b may be provided in a chair on which the player sits.

In addition, the absence-sensing sensor 171a may include an operation time measurement member (not illustrated).

The operation time measurement member (not illustrated) may determine the presence or absence of the player based on the time during which the player manipulates the panel body 110 to play a game.

For example, when the operation time measurement member measures the time at which a manipulation signal is generated in the panel body 110 and the result of measurement is that no manipulation signal has been generated for longer than a preset time, the operation time measurement member may determine that the player has left the game device 200 and may generate a warning signal to warn the player via the warning member 175.

In addition, the absence-sensing sensor 171a may include a card reader 171c.

The card reader 171c may read a player card having recorded therein game information such as, for example, game money and bonus points for the play of a game. When the player card is inserted to play a game, the card reader 171c may determine that the player is playing a game. When the player card is removed, the card reader may determine that the player has left the game device 200 and may warn the player via the warning member 175.

The case in which the absence-sensing sensor 171a is realized by the card reader 171c corresponds only to the case in which the player uses only the player card without receiving game information provided from the game room via the portable device 300.

In addition, the absence-sensing sensor 171a may include a camera 171d.

The camera 171d may capture an image of the player who is playing a game, and may determine the presence or absence of the player based on the captured image.

For example, when capturing an image of the player, the camera 171d may determine that the player is playing a game. When no image of the player is captured, the camera may determine that the player has left the game device 200 and may generate a warning signal to warn the player via the warning member 175.

In addition, it is to be noted that, when sensing the absence of the player via two or more of the above-described sensing members, the absence-sensing sensor 171a may determine the absence of the player and therefore cause the warning member 175 to warn the player.

As illustrated in FIG. 5, the game device 200 including the game manipulation panel capable of communicating game information according to the embodiment of the present invention may include the short-range communication module 190.

The short-range communication module 190 may transmit and receive a signal via the antenna member 191 to perform wireless communication with the portable device 300.

The short-range communication module 190 may wirelessly communicate game information with the portable device 300 via nearfield communication (NFC).

Here, the game information to be wirelessly communicated with the portable device 300 may be information related to a game such as, for example, game money, bonus points, game time, acquired scores, and the number of times a game is executed.

For example, when the game information to be wirelessly communicated with the portable device 300 is game money, game money is paid via a known payment device provided in the portable device 300. The game device 200 may receive information about the game money and may again provide, to the portable device 300, information about increases or reductions in the amount of game money while the player plays a game.

That is, the player may paid game money using only the portable device 300 without being required to exchange game money at a money-changing counter, may play a game with the paid game money, and when a balance is generated, may transmit information about the balance to the portable device 300 without requiring that the balance be printed using a printer in the game device, as in the related art, in order to manage the balance.

In addition, in some games, it is possible to accumulate bonus points, to exchange the accumulated bonus points with game money for the play of a game, or to use the bonus points without undergoing an identity verification process via subscription information or the like of the portable device 300 in convenience facilities inside a game room.

In addition, the game room provides a game room application to the portable device 300, and provides notification of an event or the like in the game room via the game room application provided in the portable device 300. As such, the game room may be effectively managed, and may obtain advertisement effects.

In this way, when the game device 200 communicates information about a game with the portable device 300, it is possible to store and manage game information in the portable device 300 to strengthen security.

Meanwhile, the game device 200, which has received the game information via wireless communication with the portable device 300, may execute a game based on this information, and may also display the game information on a game device screen.

As illustrated in FIG. 5, the game device 200 including the game manipulation panel capable of communicating game information according to the embodiment of the present invention may include a game display panel 210.

The game display panel 210 may display a game to be played, and may be formed in a curved form in order to increase a sense of immersion.

While the charger 150 and the short-range communication module 190 are being operated, the game display panel 210 may display the state of operation along with the game, and may also display various pieces of information related to the game.

As illustrated in FIG. 5, the game device 200 including the game manipulation panel capable of communicating game information according to the embodiment of the present invention may include a game device body 230.

The game device body 230 may be provided on the front surface thereof with the game manipulation panel 100, which is capable of communicating game information for playing a game, and the game display panel 210, and may also be provided therein with a game-device-driving unit to operate the respective components for operating the game device.

The operations and effects between the respective components described above will be described below with relation to the game device 200 including the game manipulation panel capable of communicating game information according to the embodiment of the present invention.

In the game device 200 including the game manipulation panel capable of communicating game information according to the embodiment of the present invention, when the player sits on a seat 250 and puts the portable device 300 on the antenna member 191 of the panel body, the device-sensing sensor 195 senses that the portable device 300 is seated, and provides a sensing signal to the game-device-driving unit.

Meanwhile, when the seating of the portable device 300 is sensed by the device-sensing sensor 195, the game-device-driving unit may operate the antenna member 191 of the short-range wireless communication module 190 so as to communicate game information with the portable device 300, and may operate the game display panel 210 so as to display game information required for a game.

Here, when the balance of game money is insufficient to allow the player to play a game, the game device 200 may directly charge the game money via wireless communication with the portable device 300.

Then, when the game terminates, the balance of game money remaining after use in the game and game information such as, for example, acquired scores and bonus points may be transmitted to the portable device via the short-range wireless communication module 190.

In addition, while the player is playing a game, the charging coil member 155 of the charger 150 located at the same position as the antenna member 191 may wirelessly charge the portable device 300 via magnetic-induction or resonance. At this time, the charging of the portable device 300 may be selectively performed by direct manipulation of the player.

When the player leaves the game device 200 in the state in which the device-sensing sensor 195 senses that the portable device 300 is located on the panel body 100, the absence-sensing sensor 171a may sense that the player has left, and may cause the warning member 175 to issue a warning so as to prevent the loss of the portable device 300.

Accordingly, the game manipulation panel 100 capable of communicating game information according to the embodiment of the present invention and the game device 200 including the same may eliminate inconvenience for the exchange of game money by transmitting and receiving game information via nearfield wireless communication with the portable device 300, may prevent the waste of paper due to the printing of the balance, may increase security and manage the game information via the portable device 300, and may enable convenient use of various benefits provided in a game room.

In addition, when the manipulation mechanism 111 is realized as the touch panel 120, the antenna member 191 or the charging coil member 155 may be formed integrally with the electrically conductive pattern 121, which may reduce manufacturing costs and simplify the structure of the manipulation mechanism to enable easy manufacture of the manipulation mechanism.

In addition, since the charger 150 is provided in the panel body 110, the portable device 300 may start to be charged at the time at which the player plays a game, and when the player leaves the game device 200 in the state in which the portable device 300 is seated on the panel body 110, a warning may be issued by the warning generator 170 so as to prevent the loss of the portable device 300.

Although the embodiments of the present invention have been disclosed for illustrative purposes, those skilled in the art will appreciate that the scope of the present invention is not limited thereto, and various modifications, additions and substitutions are possible, without departing from the scope and spirit of the invention as disclosed in the accompanying claims.

INDUSTRIAL APPLICABILITY

The present invention is applicable to industrial fields related to game machines.

The invention claimed is:
1. A game manipulation panel capable of communicating game information, the game manipulation panel comprising:
  a panel body configured to generate a manipulation signal for playing a game; and
  an antenna member positioned in a portion of the panel body to transmit and receive a signal for transferring game information to a short-range wireless communication module that performs nearfield communication (NFC) with a portable device,
  wherein the panel body comprises:
    a touch panel configured to generate the manipulation signal in response to a touch of a player;
    a display panel superimposed on the touch panel to display an image of a manipulation button that induces the touch of the player; and
    a charger positioned in a portion of the panel body to wirelessly charge the portable device by magnetic-induction or resonance,
    wherein the touch panel comprises an electrically conductive pattern configured to generate the manipulation signal in response to a touch,
    wherein a portion of the electrically conductive pattern is formed to have an antenna shape so that the electrically conductive pattern comprises the antenna member so as to transmit and receive the signal to and from the portable device, wherein the electrically conductive pattern comprises a charging coil member configured to generate the magnetic-induction or resonance of the charger.

2. The game manipulation panel according to claim 1, wherein the antenna member is an NFC antenna.

3. The game manipulation panel according to claim 1, further comprising a device-sensing sensor configured to sense whether or not the portable device is seated on the portion in which the antenna member is positioned.

4. The game manipulation panel according to claim 3, wherein the device-sensing sensor is one of the short-range communication module including the antenna member, a heat-sensing sensor, a touch sensor, an (electro)magnetic-field-sensing sensor, an IR sensor, a pressure sensor, and an illuminance sensor.

5. The game manipulation panel according to claim 1, wherein the panel body comprises a manipulation mechanism configured to generate the manipulation signal by mechanical operation.

6. A game device comprising the game manipulation panel capable of communicating game information according to claim 1, the game device further comprising:
- the short-range communication module comprising the antenna member to perform nearfield communication with a portable device;
- a game display panel configured to display an image of a game manipulated by the manipulation panel; and
- a game device body provided with the game display panel and the game manipulation panel capable of communicating game information.

* * * * *